(12) United States Patent
Yasuda

(10) Patent No.: US 8,705,058 B2
(45) Date of Patent: Apr. 22, 2014

(54) PRINT/COPY CONTROL SYSTEM INCLUDING A PROCESSING UNIT WITH A DISPLAY UNIT FOR DISPLAYING A LISTING OF ADVICE INFORMATION FOR COMPARISON

(75) Inventor: Keizo Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 13/169,094

(22) Filed: Jun. 27, 2011

(65) Prior Publication Data

US 2011/0317196 A1 Dec. 29, 2011

(30) Foreign Application Priority Data

Jun. 29, 2010 (JP) ................................. 2010-148130

(51) Int. Cl.
*G06F 3/12* (2006.01)

(52) U.S. Cl.
USPC ...................................... 358/1.13; 358/1.15

(58) Field of Classification Search
USPC .................... 358/1.13, 1.15; 399/53
See application file for complete search history.

(56) References Cited

U.S. PATENT DOCUMENTS

| 2001/0006423 A1 | 7/2001 | Subramaniam | |
| 2008/0309961 A1* | 12/2008 | Aichi et al. | 358/1.15 |
| 2010/0188681 A1* | 7/2010 | Kawano | 358/1.13 |
| 2010/0265546 A1* | 10/2010 | Mori et al. | 358/1.15 |

FOREIGN PATENT DOCUMENTS

| EP | 1 818 804 A2 | 8/2007 |
| JP | 09-277646 | 10/1997 |
| JP | 2002-006696 | 1/2002 |
| JP | 2002-304092 | 10/2002 |
| JP | 2003-260857 | 9/2003 |
| JP | 2004-178362 | 6/2004 |
| JP | 2005-310029 | 11/2005 |
| JP | 2006-203813 | 8/2006 |
| JP | 4271664 | 6/2009 |

OTHER PUBLICATIONS

Partial European Search Report dated Dec. 20, 2012.

\* cited by examiner

*Primary Examiner* — Qian Yang
(74) *Attorney, Agent, or Firm* — IPUSA, PLLC

(57) ABSTRACT

A print/copy control system including a processing unit which includes a first unit that receives a set of print/copy conditions selected by a user, a second unit that receives a standard set of print/copy conditions of an image forming device designated by the user, a third unit that receives other selectable sets of print/copy conditions of the image forming device, and a display unit that displays a listing of each of the standard set of print/copy conditions of the image forming device, the set of print/copy conditions selected by the user, and the other selectable sets of print/copy conditions of the image forming device for comparison.

15 Claims, 12 Drawing Sheets

FIG.3A

PRINT

PRINTER
NAME (M): [xxxxx MP C600 ▸]  PROPERTY...(R)
STATE: IDLE:
MODEL: OOOO xxxxx MP C6000 RPCS
LOCATION: ¥¥000.000.000¥XXXXXMPC600
COMMENTS:

☐ FILE OUTPUT (L)

PRINTING RANGE
● ALL (A)
○ PAGE DESIGNATION (G)  [ ] FROM PAGE (F)
                        [ ] TO PAGE (T)

NO. OF SHEETS
NUMBER (C): [1]

☑ PRINT BY SET NUMBER (O)

PRINTING OBJECT
○ SELECTED PORTIONS (N)   ○ WHOLE BOOK (E)
● SELECTED SHEETS (V)

[PRINT PREVIEW (W)]                    [OK]   [CANCEL]

FIG.4

| KIND | | COLOR | DUPLEX | COLLECTIVE | FINISHING | NO. OF SHEETS | RESULT INFO. | ADVICE INFO. |
|---|---|---|---|---|---|---|---|---|
| STANDARD | | FULL COLOR | NO | NO | NO | 20 | | STANDARD FINISH |
| USER SETTING | | FULL COLOR | NO | 2 IN 1 | NO | 10 | REDUCED BY 10 SHEETS FROM STANDARD | SCALING OF TEXT AND IMAGE IS REDUCED BY 71% |
| | 1 | FULL COLOR | YES | NO | NO | 10 | REDUCED BY 10 SHEETS FROM STANDARD | NOT TO REUSE PRINTED SHEETS |
| | 2 | FULL COLOR | YES | 2 IN 1 | NO | 5 | REDUCED BY 15 SHEETS FROM STANDARD | NOT TO REUSE PRINTED SHEETS, AND SCALING OF TEXT AND IMAGE IS REDUCED BY 71% |
| | 3 | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% |
| | P1 | FULL COLOR | YES | NO | BOOK-BINDING | 5 | REDUCED BY 15 SHEETS FROM STANDARD | A5-SIZE BOOKBINDING IS POSSIBLE, NOT TO REUSE PRINTED SHEETS, AND SCALING OF TEXT AND IMAGE IS REDUCED BY 71% |
| | P2 | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% |
| | P3 | MONO-CHRO. | YES | 4 IN 1 | NO | 6 | REDUCED BY 17 SHEETS FROM STANDARD | NOT TO REUSE PRINTED SHEETS, AND SCALING OF TEXT AND IMAGE IS REDUCED BY 50% |

FIG.5

| KIND | COLOR | DUPLEX | COLLECTIVE | FINISH-ING | NO. OF SHEETS | RESULT INFO. | ADVICE INFO. | CO2 EMIS-SIONS (kg) | CO2 REDUC-TION (kg) |
|---|---|---|---|---|---|---|---|---|---|
| STANDARD | FULL COLOR | NO | NO | NO | 20 | | STANDARD FINISH | 0.5 | 0 |
| USER SETTING | FULL COLOR | NO | 2 IN 1 | NO | 10 | REDUCED BY 10 SHEETS FROM STANDARD | SCALING OF TEXT AND IMAGE IS REDUCED BY 71% | 0.25 | 0.25 |
| 1 | FULL COLOR | YES | NO | NO | 10 | REDUCED BY 10 SHEETS FROM STANDARD | NOT TO REUSE PRINTED SHEETS | 0.25 | 0.25 |
| 2 | FULL COLOR | YES | 2 IN 1 | NO | 5 | REDUCED BY 15 SHEETS FROM STANDARD | NOT TO REUSE PRINTED SHEETS, AND SCALING OF TEXT AND IMAGE IS REDUCED BY 71% | 0.125 | 0.375 |
| 3 | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% | 0.075 | 0.425 |
| P1 | FULL COLOR | YES | NO | BOOK-BINDING | 5 | REDUCED BY 15 SHEETS FROM STANDARD | A5-SIZE BOOKBINDING IS POSSIBLE, NOT TO REUSE PRINTED SHEETS, AND SCALING OF TEXT AND IMAGE IS REDUCED BY 71% | 0.125 | 0.375 |
| P2 | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% | 0.075 | 0.425 |
| P3 | MONO-CHRO. | YES | 4 IN 1 | NO | 6 | REDUCED BY 17 SHEETS FROM STANDARD | NOT TO REUSE PRINTED SHEETS, AND SCALING OF TEXT AND IMAGE IS REDUCED BY 50% | 0.0375 | 0.4625 |

FIG.6

| | CO2 EMISSIONS (kg) | CO2 REDUCTION (kg) |
|---|---|---|
| TODAY | 3 | 1 |
| WEEKLY | 15 | 5 |
| MONTHLY | 60 | 20 |
| YEARLY | 720 | 240 |

FIG.9

| KIND | | COLOR | DUPLEX | COLLECTIVE | FINISH-ING | NO. OF SHEETS | RESULT INFO. | ADVICE INFO. |
|---|---|---|---|---|---|---|---|---|
| STANDARD | | FULL COLOR | NO | NO | NO | 20 | | STANDARD FINISH |
| USER SETTING | 1 | FULL COLOR | NO | 2 IN 1 | NO | 10 | REDUCED BY 10 SHEETS FROM STANDARD | SCALING OF TEXT AND IMAGE IS REDUCED BY 71% |
| | 2 | FULL COLOR | YES | NO | NO | 10 | REDUCED BY 10 SHEETS FROM STANDARD | NOT TO REUSE PRINTED SHEETS |
| | 3 | FULL COLOR | YES | 2 IN 1 | NO | 5 | REDUCED BY 15 SHEETS FROM STANDARD | NOT TO REUSE PRINTED SHEETS, AND SCALING OF TEXT AND IMAGE IS REDUCED BY 71% |
| | | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% |

FIG.10

| KIND | COLOR | DUPLEX | COLLECTIVE | FINISH-ING | NO. OF SHEETS | RESULT INFO. | ADVICE INFO. | $CO_2$ EMIS-SIONS (kg) | $CO_2$ REDUC-TION (kg) |
|---|---|---|---|---|---|---|---|---|---|
| STANDARD | FULL COLOR | NO | NO | NO | 20 | | STANDARD FINISH | 0.5 | 0 |
| USER SETTING | FULL COLOR | NO | 2 IN 1 | NO | 10 | REDUCED BY 10 SHEETS FROM STANDARD | SCALING OF TEXT AND IMAGE IS REDUCED BY 71% | 0.25 | 0.25 |
| 1 | FULL COLOR | YES | NO | NO | 10 | REDUCED BY 10 SHEETS FROM STANDARD | NOT TO REUSE PRINTED SHEETS | 0.25 | 0.25 |
| 2 | FULL COLOR | YES | 2 IN 1 | NO | 5 | REDUCED BY 15 SHEETS FROM STANDARD | NOT TO REUSE PRINTED SHEETS, AND SCALING OF TEXT AND IMAGE IS REDUCED BY 71% | 0.125 | 0.375 |
| 3 | FULL COLOR | YES | 4 IN 1 | NO | 3 | REDUCED BY 17 SHEETS FROM STANDARD | NOT TO REUSE PRINTED SHEETS, AND SCALING OF TEXT AND IMAGE IS REDUCED BY 50% | 0.075 | 0.425 |

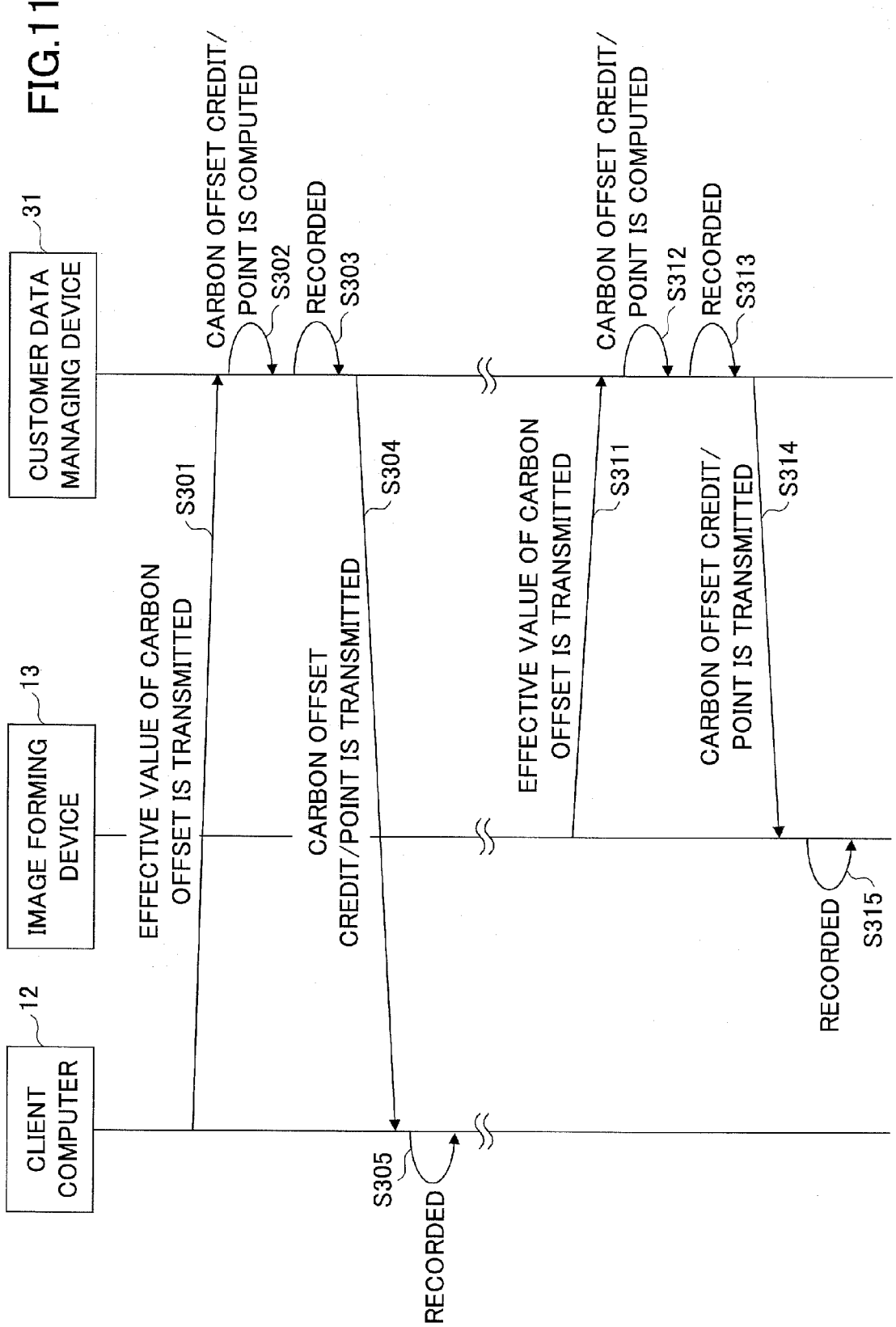

PRINT/COPY CONTROL SYSTEM INCLUDING A PROCESSING UNIT WITH A DISPLAY UNIT FOR DISPLAYING A LISTING OF ADVICE INFORMATION FOR COMPARISON

BACKGROUND OF THE INVENTION

1. Field of the Invention

The present disclosure relates to a print/copy control system which is arranged to promote use of print/copy conditions of non-standard functions of an image forming device when starting execution of a printing or copying process.

2. Description of the Related Art

In the existing office environment, if a print job of a document from a client computer, such as a PC (personal computer), is input to an image forming device, such as an MFP (multi-function peripheral), a printing process is performed by the image forming device according to the input print job. Or, if a user brings a document to the installation site of an image forming device and inputs a copy job to the image forming device, a copying process is performed by the image forming device according to the input copy job.

Usually, when one of a plurality of sets of print/copy conditions of the image forming device is selectable, a standard set of print/copy conditions (default set) is preferentially displayed in a printing dialog box of the client computer or an operation panel of the image forming device. If execution of the printing/copying process is requested without changing the contents of the standard set, the printing or copying process is immediately performed using the standard set of print/copy conditions.

There are several sets of print/copy conditions with respect to non-standard functions of the image forming device which are not included in the standard set of the print/copy conditions, such as duplex, collective mode, finishing, etc., and some users are unaccustomed to the non-standard functions of the image forming device. Hence, in many cases, the printing/copying process is performed by using the standard set of the print/copy conditions.

For example, even if the use of the non-standard function of duplex or collective mode will result in the saving of the number of sheets, the amount of toner or the amount of electric power, which can ultimately reduce the amount of carbon dioxide ($CO_2$) emission, the user is not positively urged to select the non-standard function.

On the other hand, Japanese Laid-Open Patent Publication No. 2005-310029 discloses a method of a print control for facilitating the setting of print conditions. In this print control method, the user is urged to select one of several printing categories, including "ecology", "bookbinding", "security" and "simple", the print setting items related to the selected printing category are extracted, and the excerpt of the print setting items is merely displayed. Hence, the user is requested to select final print setting items from the excerpt of the print setting items displayed, and this does not provide a sufficient support for the user who is unaccustomed to the non-standard functions.

SUMMARY OF THE INVENTION

In one aspect, the present disclosure provides a print/copy control system which is capable of promoting selection of non-standard sets of print/copy conditions of an image forming device when starting execution of a printing/copying process.

In an embodiment which solves or reduces one or more of the above-mentioned problems, the present disclosure provides a print/copy control system including a processing unit, the processing unit including: a first unit to receive a set of print/copy conditions selected by a user; a second unit to receive a standard set of print/copy conditions of an image forming device designated by the user; a third unit to receive other selectable sets of print/copy conditions of the image forming device; and a display unit to display a listing of each of the standard set of print/copy conditions of the image forming device, the set of print/copy conditions selected by the user, and the other selectable sets of print/copy conditions of the image forming device for comparison.

In an embodiment which solves or reduces one or more of the above-mentioned problems, the present disclosure provides an image forming device including a processing unit, the processing unit including: a response unit to transmit a standard set of print conditions and other selectable sets of print conditions in response to a request received from an external device; a first unit to receive a set of copy conditions selected by a user at a time of a document copying setting; a second unit to receive a standard set of copy conditions; a third unit to receive other selectable sets of copy conditions; and a display unit to display a listing of each of the standard set of copy conditions, the set of copy conditions selected by the user and the other selectable sets of copy conditions for comparison.

In an embodiment which solves or reduces one or more of the above-mentioned problems, the present disclosure provides a print/copy control method for use in a print/copy control system including a processing unit, the method including: receiving, by a first unit of the processing unit, a set of print/copy conditions selected by a user; receiving, by a second unit of the processing unit, a standard set of print/copy conditions of an image forming device designated by the user; receiving, by a third unit of the processing unit, other selectable sets of print/copy conditions of the image forming device; and displaying, by a display unit of the processing unit, a listing of each of the standard set of print/copy conditions of the image forming device, the set of print/copy conditions selected by the user, and the other selectable sets of print/copy conditions of the image forming device for comparison.

Other objects, features and advantages of the present disclosure will become more apparent from the following detailed description when read in conjunction with the accompanying drawings.

BRIEF DESCRIPTION OF THE DRAWINGS

FIGS. 3A and 3B are diagrams showing an example of a printing dialog box.

FIG. 4 is a diagram showing an example of comparison information, result information, and advice information displayed on the client computer.

FIG. 5 is a diagram showing an example of comparison information, result information, advice information, and $CO_2$ information displayed on the client computer.

FIG. 6 is a diagram showing an example of $CO_2$ integrated amount.

FIG. 9 is a diagram showing an example of comparison information, result information, and advice information displayed on the image forming device.

FIG. 10 is a diagram showing an example of comparison information, result information, advice information, and CO2 information displayed on the image forming device.

FIG. 11 is a sequence diagram for explaining a communication process performed by the print/copy control system by accessing a manufacturer system.

DETAILED DESCRIPTION OF THE PREFERRED EMBODIMENTS

A description will be given of embodiments of the present disclosure with reference to the accompanying drawings.

Figure 1:
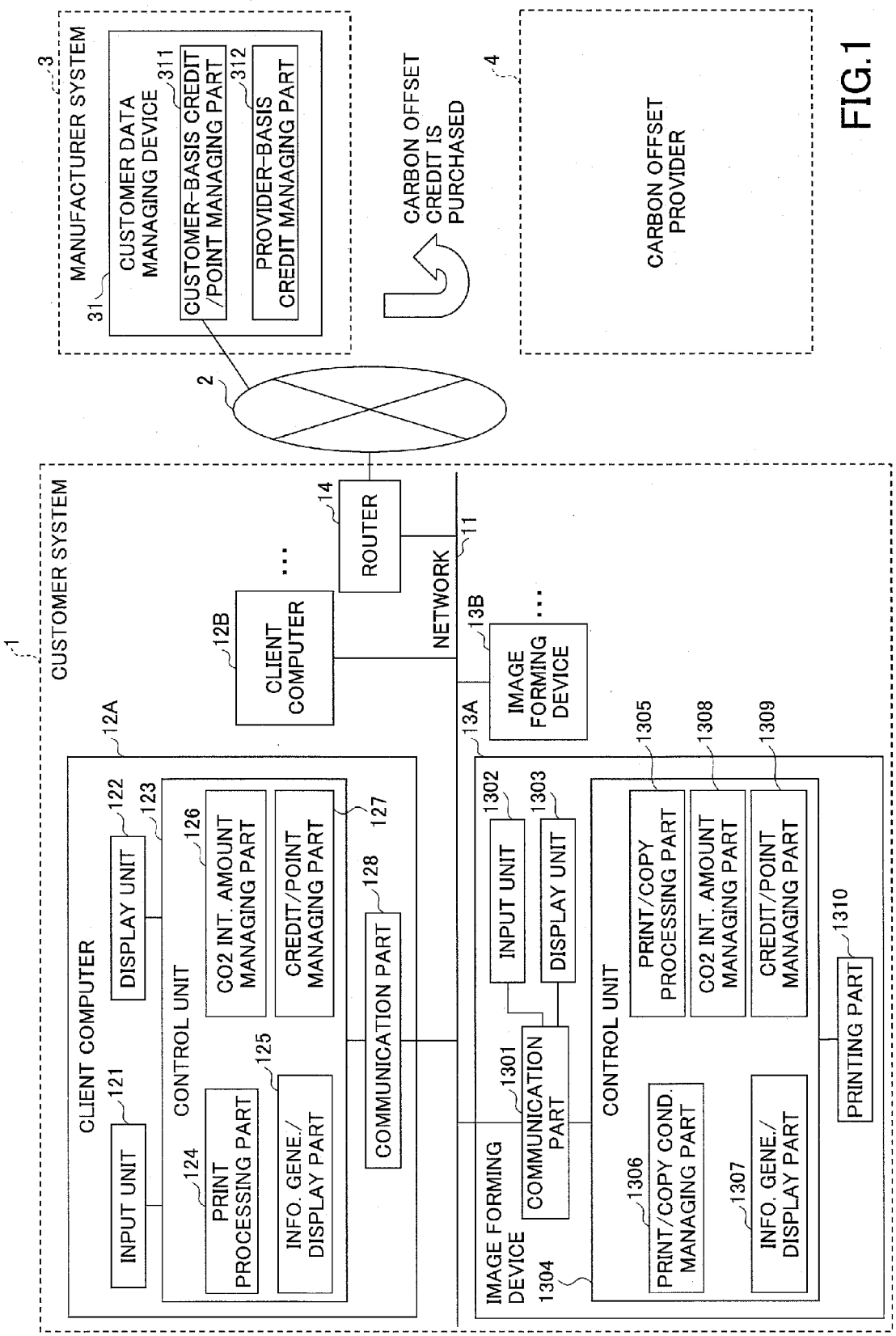
FIG. 1 is a diagram showing the composition of a print/copy control system of an embodiment of the present disclosure.

FIG. 1 is a diagram showing the composition of a print/copy control system of an embodiment of the present disclosure.

In the print/copy control system shown in FIG. 1, a customer system 1 is connected to a manufacturer system 3 via a network 2. In the customer system 1, a plurality of client computers 12A, 12B, . . . , a plurality of image forming devices 13A, 13B, . . . , and a router 14 are connected together to a local network 11. The router 14 is further connected to the network 2.

Each client computer 12 (one of the client computers 12A, 12B, . . . ) includes an input unit 121, a display unit 122, a control unit 123, and a communication part 128. The control unit 123 is provided with a print processing part 124, an information generation/display part 125, a CO2 integrated amount managing part 126, and a credit/point managing part 127. The information generation/display part 125 generates and displays setting comparison information, result information, advice information, and CO2 information.

The input unit 121 includes a keyboard and a mouse and receives an input operation from a user. The display unit 122 includes a display monitor and displays a display screen, such as a printing dialog box, on the display monitor, which is presented to a user.

The control unit 123 includes a CPU (central processing unit), a memory, etc. and performs a main control process of the client computer 12 according to a computer program read from the memory.

The print processing part 124 includes an application program which is configured to perform generation and renewal of a document, and a printer driver. The print processing part 124 sends a printing request and printing data to the image forming device 13 (one of the image forming devices 13A, 13B, . . . ,) which is arranged in the network 11.

The information generation/display part 125 generates setting comparison information, result information, advice information, and CO2 information at a time of selecting print conditions of a document, and displays the listing of the respective items of the setting comparison information, the result information, the advice information, and the CO2 information on the display unit 122.

The setting comparison information is information for giving a user the listing of the standard set of print conditions of the image forming device 13 designated by the user, a set of print conditions of the image forming device 13 selected by the user, and other selectable print conditions (non-standard print conditions) of the image forming device 13, in order to allow the comparison by the user. The setting items of the print conditions include use color, duplex/simplex, collective mode, finishing (bookbinding, etc.), the number of sheets, scaling, etc. The setting comparison information is generated as follows. The set of print conditions selected by the user is acquired from the input unit 121 (which is the default set if an input operation on the input unit 121 is not performed positively), the standard set of print conditions and the non-standard sets of print conditions which are selectable are acquired from the image forming device 13, and the setting comparison information is generated by arranging the corresponding items of these sets of print conditions on a setting-item basis. Alternatively, the setting comparison information may contain the print conditions which are selectable in other image forming devices 13 connected to the network 11, and acquired from such image forming devices 13 via the network 11.

The result information is reference information for the user, which indicates the result of a printing process when performed by using the corresponding print conditions. The amount of reduction of consumption of consumables, such as recording sheets and toner, the amount of reduction of electric power, etc. are contained in the result information. Regarding the information which is represented by a numerical value, a predetermined formula for computing the numerical value is held internally in the client computer 12, and the numerical value is computed based on the formula. Regarding the information which is represented as a message, the message is associated with the print conditions and held internally in the client computer 12, and the message corresponding to the print conditions is acquired. The result information in which a numerical value and a message coexist uses both the contents of the numerical value and the message. For example, in a case in which the number of sheets in the standard set (in which no collective mode is used) is equal to "20" and the number of sheets in the collective mode "2 in 1" is equal to "10", the amount of reduction of the number of sheets in this case is set to 10 (=20−10) and a message indicating "the number of sheets will be reduced by ten sheets from the standard set" is contained in the result information.

The advice information is reference information for the user, which calls a user's attention when starting a printing process by using the corresponding print conditions. The scaling of text and image after the printing process is contained in the advice information. Regarding the information which is represented by a numerical value, a predetermined formula for computing the numerical value is held internally in the client computer 12, and the numerical value is computed based on the formula. Regarding the information which is represented as a message, the message is associated with the print conditions and held internally in the client computer 12, and the message corresponding to the print conditions is acquired. The advice information in which a numerical value and a message coexist uses both the contents of the numerical value and the message. For example, in a case of the collective mode "2 in 1" when no collective mode is used in the standard set, a message indicating "the scaling of text and image is reduced by 71%" is contained in the advice information.

The CO2 information contains both the amount of CO2 emissions when a printing process is performed by using the corresponding print conditions, and the amount of CO2 reduction which indicates the decrement from the amount of CO2 emissions when a printing process is performed by using the standard set of print conditions. The amount of CO2 emissions is computed based on the basic data (including a theoretical value and an experimental value) with respect to a standard document, depending on the use of color/monochrome, the number of surfaces being printed, the paper size, etc.

The $CO_2$ integrated amount managing part 126 computes the integrated amount of each of the amount of $CO_2$ emissions and the amount of $CO_2$ reduction, corresponding to the print conditions which are finally selected by the user and used to perform the printing process, on a daily basis, a weekly basis, a monthly basis, a yearly basis, etc. (or simply computes the total thereof) and displays the results of the computations on the display unit 122.

The credit/point managing part 127 notifies the manufacturer system 3 of the integrated amount of $CO_2$ emissions or the amount of $CO_2$ reduction from the $CO_2$ integrated amount managing part 126 as a formal effective value of carbon offset (specified by a governmental organization, etc.). The credit/point managing part 127 receives from the manufacturer system 3 a notice of a carbon offset credit or point in accordance with the notified effective value of carbon offset and displays the received carbon offset credit or point on the display unit 122. Alternatively, the credit/point managing part 127 may send a notice of a formal effective value of carbon offset to a system of a specific organization instead of the manufacturer system 3. A carbon offset credit is a right which can be diplomatically asserted as the right for $CO_2$ emission limitation target. For example, the CER (certified emission reduction) may be used as the carbon offset credit. A carbon offset point is an alternative to a predetermined carbon offset credit as defined by the manufacturer of the image forming device 13, and can be exchanged for a certain target product. Alternatively, the carbon offset point may be replaced by a coupon that allows the user to purchase a specific product.

The communication part 128 performs a data communication of the client computer 12 with the network 11.

Moreover, in the print/copy control system of FIG. 1, each image forming device 13 (one of the image forming devices 13A, 13B, ...) includes a communication part 1301, an input unit 1302, a display unit 1303, a control unit 1304, and a printing part 1310. The control unit 1304 is provided with a print/copy processing part 1305, a print/copy conditions managing part 1306, an information generation/display part 1307, a $CO_2$ integrated amount managing part 1308, and a credit/point managing part 1309. The information generation/display part 1307 generates and displays setting comparison information, result information, advice information and $CO_2$ information.

The communication part 1301 performs a data communication of the image forming device 13 with the network 11. The input unit 1302 includes a set of buttons, a touch panel, etc., and receives an input operation from a user. The display unit 1303 includes a liquid crystal display (LCD) panel and displays a setting screen on the LCD panel, which is presented to a user.

The control unit 1304 includes a CPU, a memory, etc. and performs a main control process of the image forming device 13 according to a computer program read from the memory.

The print/copy processing part 1305 performs a control process of printing of a document based on a print job received from the client computer 12, and performs a control process of a copying process based on a copy job received from the image forming device 13.

The print/copy conditions managing part 1306 manages the standard set of print/copy conditions of the image forming device 13, and manages other selectable sets of print/copy conditions. The print/copy conditions managing part 1306 sends a notice of the standard set of print conditions of the image forming device 13 and the other selectable sets of print conditions to the client computer 12 in response to an inquiry received from the client computer 12.

The information generation/display part 1307 generates setting comparison information, result information, advice information, and $CO_2$ information at a time of selecting copy conditions of a document, and displays the listing of the respective items of the setting comparison information, the result information, the advice information, and the $CO_2$ information on the display unit 122.

The setting comparison information is information for giving a user the listing of the standard set of copy conditions of the image forming device 13 designated by the user, a set of copy conditions of the image forming device 13 selected by the user, and other selectable copy conditions (non-standard copy conditions) of the image forming device 13, in order to allow the comparison by the user. The setting items of the copy conditions include use color, duplex/simplex, collective mode, finishing (bookbinding etc.), the number of sheets, scaling, etc. The setting comparison information is generated as follows. The set of copy conditions selected by the user is acquired from the input unit 1302 (which is the default set if an input operation on the input unit 1302 is not performed positively), the standard set of copy conditions and the non-standard sets of copy conditions which are selectable are acquired from the print/copy conditions managing part 1306, and the setting comparison information is generated by arranging the corresponding items of these sets of copy conditions on a setting-item basis.

The result information is reference information for the user, which indicates the result of a copying process when performed by using the corresponding copy conditions. The amount of reduction of consumption of consumables, such as recording sheets and toner, the amount of reduction of electric power, etc. are contained in the result information. Regarding the information which is presented by a numerical value, a predetermined formula for computing the numerical value is held internally in the image forming device 13, and the numerical value is computed based on the formula. Regarding the information which is represented as a message, the message is associated with the copy conditions and held internally in the image forming device 13, and the message corresponding to the copy conditions is acquired. The result information in which a numerical value and a message coexist uses both the contents of the numerical value and the message.

The advice information is reference information for the user, which calls a user's attention when starting a copying process by using the corresponding copy conditions. The scaling of text and image after the copying process is contained in the advice information. Regarding the information which is represented by a numerical value, a predetermined formula for computing the numerical value is held internally in the image forming device 13, and the numerical value is computed based on the formula. Regarding the information which is represented as a message, the message is associated with the copy conditions and held internally in the image forming device 13, and the message corresponding to the copy conditions is acquired. The advice information in which a numerical value and a message coexist uses both the contents of the numerical value and the message.

The $CO_2$ information contains both the amount of $CO_2$ emissions when a copying process is performed by using the corresponding copy conditions, and the amount of $CO_2$ reduction which indicates the decrement from the amount of $CO_2$ emissions when a copying process is performed by using the standard set of copy conditions. The amount of $CO_2$ emissions is computed based on the basic data (including a theoretical value and an experimental value) with respect to a standard document, depending on the use of color/monochrome, the number of surfaces being printed, the paper size, etc.

The CO2 integrated amount managing part 1308 computes the integrated amount of each of the amount of CO2 emissions and the amount of CO2 reduction corresponding to the copy conditions which are finally selected by the user and used to perform the copying process, on a daily basis, a weekly basis, a monthly basis, a yearly basis, etc. (or simply computes the total thereof) and displays the results of the computations on the display unit 1303.

The credit/point managing part 1309 notifies the manufacturer system 3 of the integrated amount of CO2 emissions or the amount of CO2 reduction from the CO2 integrated amount managing part 1308 as a formal effective value of carbon offset (specified by a governmental organization, etc.). The credit/point managing part 1309 receives from the manufacturer system 3 a notice of a carbon offset credit or point in accordance with the notified effective value of carbon offset and displays the received carbon offset credit or point on the display unit 1303. Alternatively, the credit/point managing part 1309 may send a notice of a formal effective value of carbon offset to a system of a specific organization instead of the manufacturer system 3. A carbon offset credit is a right which can be diplomatically asserted as the right for CO2 emission limitation target. For example, the CER (certified emission reduction) may be used as the carbon offset credit. A carbon offset point is an alternative to a predetermined carbon offset credit as defined by the manufacturer of the image forming device 13, and can be exchanged for a certain target product. Alternatively, the carbon offset point may be replaced by a coupon that allows the user to purchase a specific product.

When a specific product purchased by the user is placed in the main part of the image forming device 13 and an input operation is manually performed by the user (or the input operation is automatically performed), the credit/point managing part 1309 records a message that the cost of the carbon offset credit has been added to the image forming device 13, and notifies the message to the manufacturer system 3. Thereby, the carbon offset credits of the purchased products can be managed in a unified manner by the credit/point managing part 1309.

The printing part 1310 includes a printer engine, an image scanner, etc., and performs printing and copying processes.

Moreover, in the print/copy control system of FIG. 1, the manufacturer system 3 includes a customer data managing device 31. The customer data managing device 31 includes a customer-basis credit/point managing part 311 and a provider-basis credit managing part 312.

The customer-basis credit/point managing part 311 receives notices of the integrated amounts of CO2 emissions or the amounts of CO2 reduction from the client computers 12 and the image forming devices 13 respectively, and manages each of the integrated amounts of CO2 emissions or the amounts of CO2 reduction on a customer basis. Alternatively, the customer-basis credit/point managing part 311 may manage each of the integrated amounts of CO2 emissions or the amounts of CO2 reduction on a client-computer basis or on an image-forming-device basis. The customer-basis credit/point managing part 311 sends a notice of a carbon offset credit or point in accordance with the received effective value of carbon offset to a corresponding one of the client computers 12 or the image forming devices 13. A carbon offset credit or point corresponding to the cost of carbon offset assigned to the products (a photo conductor, a development unit, toner, etc.) purchased by the customer may be included in the carbon offset credit or point notified to the corresponding one of the client computers 12 or the image forming devices 13.

The provider-basis credit managing part 312 manages the carbon offset credit or point which the manufacturer has purchased from a carbon offset provider 4, on a carbon-offset-provider basis.

Figure 2:
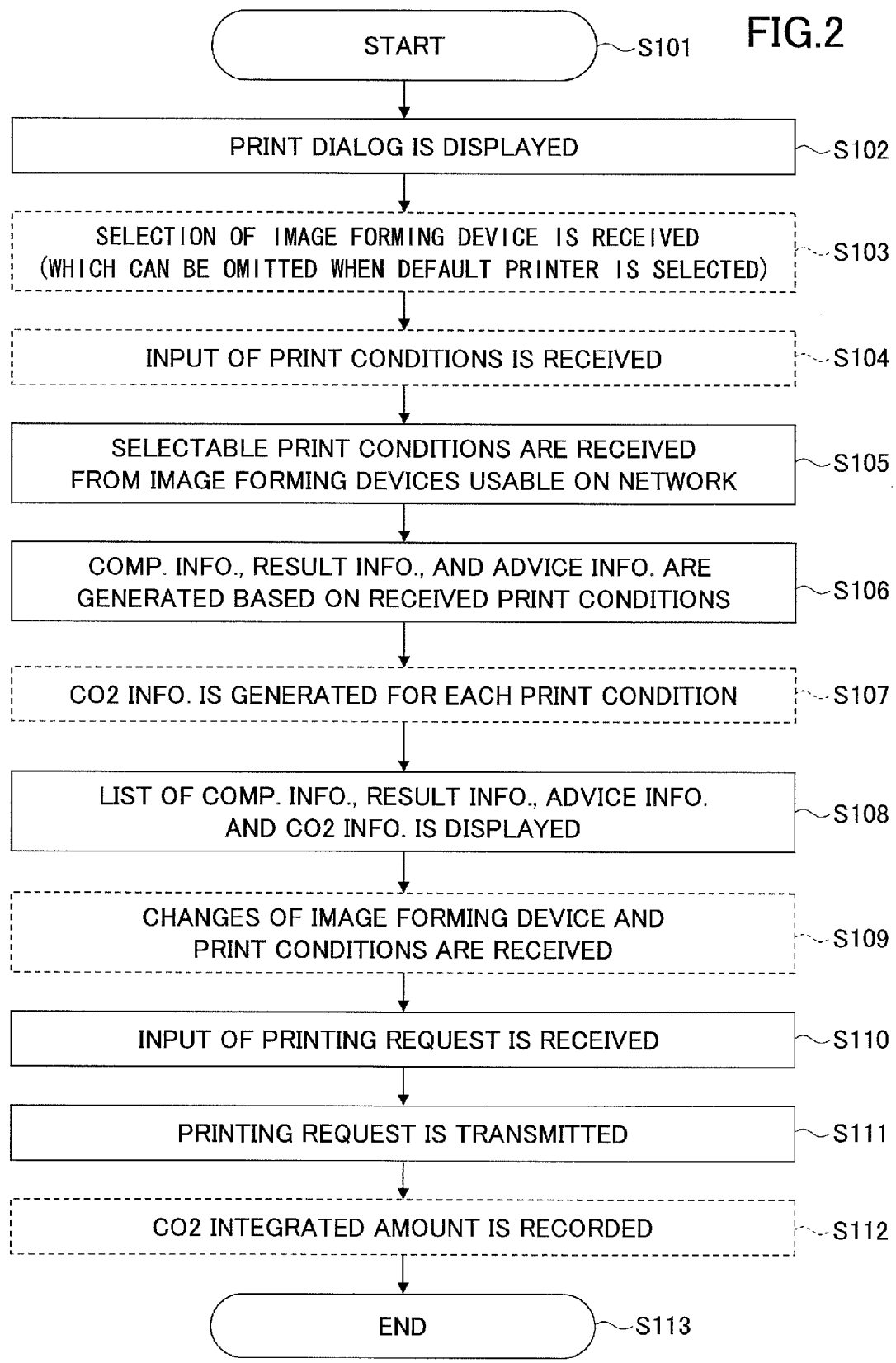
FIG. 2 is a flowchart for explaining a printing process which is performed by a client computer in the print/copy control system.

FIG. 2 is a flowchart for explaining a printing process which is performed by a client computer 12 in the print/copy control system of the present embodiment.

The printing process of FIG. 2 is started when a printing program is selected from among the application programs installed in the client computer (step S101). The print processing part 124 displays a printing dialog box on the display unit 122 (step S102). An example of the printing dialog box is shown in FIG. 3A.

As shown in FIG. 2, when an image forming device 13 to perform the printing process is selected by clicking a corresponding button in the printing dialog box by using the input unit 121, the print processing part 124 receives the selection of the image forming device 13 to perform the printing process (step S103). If no particular input operation is performed by the user at this time, a selection of a default printer is received.

Figure 3B:
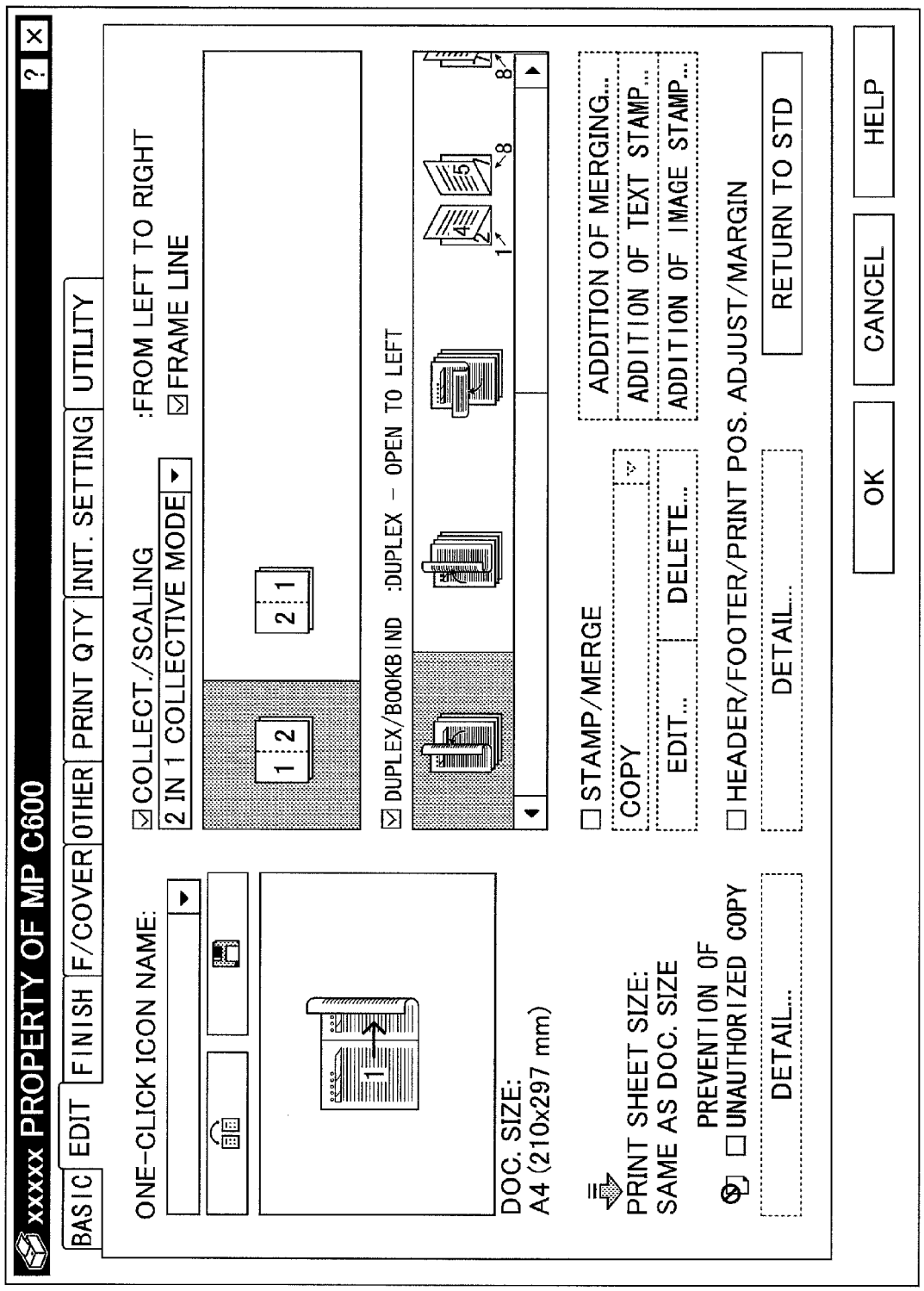

Subsequently, when an input (selection) of a set of print conditions is performed by the input unit 121 by clicking a corresponding button in the printing dialog box, the print processing part 124 receives the selection of the set of print conditions (step S104). An example of the screen in which a selection of setting items in the collective mode is input by the user is shown in FIG. 3B. When the set of print conditions is not altered by the user, a selection of the default set of print conditions is received.

Subsequently, as shown in FIG. 2, the information generation/display part 125 receives the information of selectable print conditions from the other available image forming devices 13 in the network 11, including the information of the print conditions of the image forming device 13 selected by the user (step S105). At this time, an inquiry from the information generation/display part 125 is transmitted to the print/copy conditions managing part 1306 through the communication part 128, the network 11, and the communication part 1301 of the image forming device 13, and the information of the selectable print conditions is returned from the print/copy conditions managing part 1306 to the information generation/display part 125.

Subsequently, the information generation/display part 125 generates the setting comparison information, the result information and the advice information based on the print conditions of the image forming device 13 selected by the user and the other selectable print conditions of the other image forming devices (step S106).

The information generation/display part 125 generates the CO2 information with respect to each of the set of print conditions of the image forming device 13 selected by the user and the other selectable sets of print conditions of the other image forming devices (step S107).

Subsequently, the information generation/display part 125 displays the listing of the respective items of the setting comparison information, the result information, the advice information, and the CO2 information on the display unit 122 (step S108).

An example of the screen of the listing displayed in the client computer 12 at this time is shown in FIG. 4. In the example of FIG. 4, the setting comparison information is represented by the listing of the columns "kind", "color", "duplex", "collective mode" and "finishing" in the screen, the result information is represented by the listing of the columns "number of sheets" and "result information" in the screen, and the advice information is represented by the listing of the column "advice information" in the screen. The rows in the screen, which are indicated by "standard", "user setting", "1", "2" and "3" at the column "kind", correspond to the sets of print conditions of the image forming device 13 selected by the user. The rows in the screen, which are indicated by "P1", "P2" and "P3" at the column "kind", correspond to the sets of the selectable print conditions of the other available image forming devices 13 in the network 11.

Another example of the screen of the listing displayed in the client computer 12 at this time is shown in FIG. 5. In addition to all the items of the screen of FIG. 4, the CO2 information, represented by the listing of the columns "CO2 emissions" and "CO2 reduction" in the screen, is displayed in the example of FIG. 5.

Referring back to FIG. 2, if changes of the image forming device 13 and the print conditions are input by the input unit 121 by clicking a corresponding button in the printing dialog box, the print processing part 124 receives a request of the changes (step S109). For example, when one of the rows in the listing screen of FIG. 4 or FIG. 5 is selected by the user, a selection of the image forming device 13 and the set of print conditions corresponding to that row in the listing screen is received. When an input operation to change the image forming device 13 and the set of print conditions is not performed, a selection of the currently input image forming device 13 and the currently input set of print conditions is received.

Subsequently, as shown in FIG. 2, if a printing request is input by the input unit 121 by clicking a corresponding button in the printing dialog box, the print processing part 124 receives the printing request (step S110).

Thereby, the print processing part 124 transmits the printing request including the document data to the corresponding image forming device 13 through the communication part 128 and the network 11 (step S111). When the printing request is received at the image forming device 13 through the communication part 1301, the control unit 1304 of the image forming device 13 performs the printing process by using the printing part 1310.

Subsequently, the CO2 integrated amount managing part 126 of the client computer 12 computes and records the integrated amount of each of the amount of CO2 emissions and the amount of CO2 reduction corresponding to the set of print conditions which has been used to perform the printing process (step S112). The CO2 integrated amount managing part 126 manages the integrated amount of each of the amount of CO2 emissions and the amount of CO2 reduction on a daily basis, a weekly basis, a monthly basis, and a yearly basis, and displays the results of the computations automatically or in response to a displaying request input from the user. An example of the CO2 integrated amount displayed in the client computer 12 at this time is shown in FIG. 6.

Subsequently, the printing process of FIG. 2 is terminated (step S113).

Figure 7:
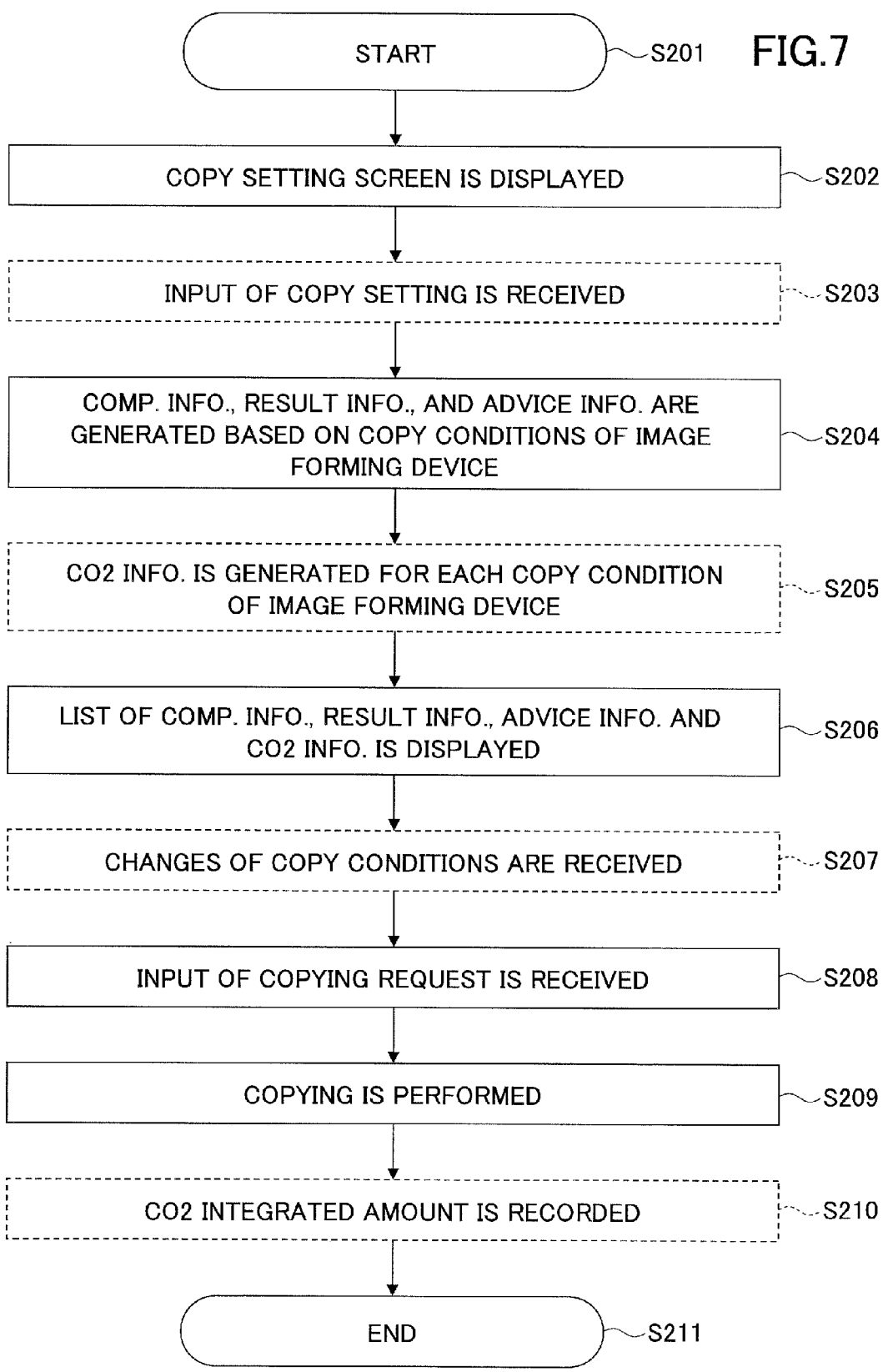
FIG. 7 is a flowchart for explaining a copying process which is performed by an image forming device in the print/copy control system.

FIG. 7 is a flowchart for explaining a copying process which is performed by an image forming device 13 in the print/copy control system of the present embodiment.

Figure 8:
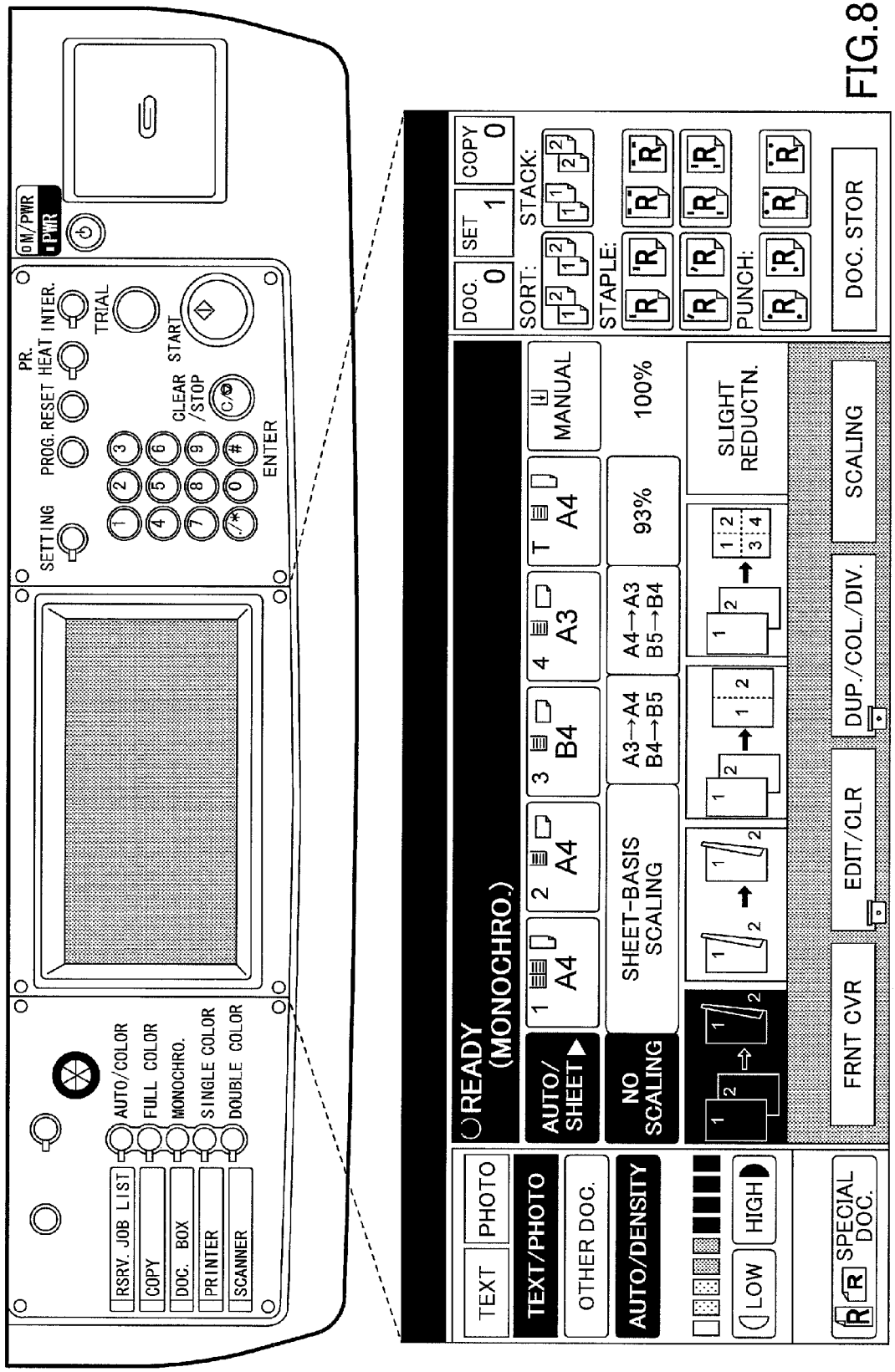
FIG. 8 is a diagram showing an example of a copy setting screen.

The copying process of FIG. 7 is started when a copy function is selected from among the functions installed in the image forming device 13 by the user using the input unit 1302 (step S201). The print/copy processing part 1305 displays a copy setting screen on the display unit 1303 (step S202). An example of the copy setting screen displayed on the display unit 1303 (or an LCD panel of an operation panel) at this time is shown in FIG. 8.

Subsequently, as shown in FIG. 7, when a set of copy conditions is input (or selected) by the input unit 1302 by pressing a corresponding button in the copy setting screen, the print/copy processing part 1305 receives the selection of the set of copy conditions (step S203). If no input operation to change the set of copy conditions is performed by the user, a selection of the default set of copy conditions is received.

Subsequently, the information generation/display part 1307 receives the selectable sets of copy conditions of the image forming device 13 from the print/copy conditions managing part 1306, and generates the setting comparison information, the result information, and the advice information based on the set of copy conditions selected by the user and the other selectable sets of copy conditions of the other image forming devices (step S204).

The information generation/display part 1307 generates the CO2 information with respect to each of the set of copy conditions selected by the user and the other selectable sets of copy conditions of the other image forming devices (step S205).

Subsequently, the information generation/display part 1307 displays the listing of the respective items of the setting comparison information, the result information, the advice information, and the CO2 information on the display unit 1303 (step S206).

An example of the screen of the listing displayed in the image forming device 13 at this time is shown in FIG. 9. In the example of FIG. 9, the setting comparison information is represented by the listing of the columns "kind", "color", "duplex", "collective mode" and "finishing" in the screen, the result information is represented by the listing of the columns "number of sheets" and "result information" in the screen, and the advice information is represented by the listing of the column "advice information" in the screen.

Another example of the screen of the listing displayed in the image forming device 13 at this time is shown in FIG. 10. In addition to all the items of the screen of FIG. 9, the CO2 information, represented by the listing of the columns "CO2 emissions" and "CO2 reduction" in the screen, is displayed in the example of FIG. 10.

Subsequently, as shown in FIG. 7, if changes of the copy conditions are input by the input unit 1302 by pressing a corresponding button in the copy setting screen, the print/copy processing part 1305 receives a request of the changes (step S207). For example, when one of the rows in the listing screen of FIG. 9 or FIG. 10 is selected by the user, a selection of the set of copy conditions corresponding to that row in the listing screen is received. When an input operation to change the set of copy conditions is not performed, a selection of the currently input set of copy conditions is received.

Subsequently, as shown in FIG. 7, if a copying request is input by the input unit 1302 by pressing a corresponding button in the copy setting screen, the print/copy processing part 1305 receives the copying request (step S208). Thereby, the print/copy processing part 1305 performs the copying process by using the printing part 1310 (step S209).

Subsequently, the CO2 integrated amount managing part 1308 computes and records the integrated amount of each of the amount of CO2 emissions and the amount of CO2 reduction corresponding to the set of copy conditions which has been used to perform the copying process (step S210). The CO2 integrated amount managing part 1308 manages the integrated amount of each of the amount of CO2 emissions and the amount of CO2 reduction on a daily basis, a weekly basis, a monthly basis, and a yearly basis, and displays the results of the computations automatically or in response to a displaying request input from the user.

Subsequently, the copying process of FIG. 7 is terminated (step S211).

FIG. 11 is a sequence diagram for explaining an example of a communication process by the print/copy control system of the present embodiment by accessing the manufacturer system 3.

As shown in FIG. 11, at a predetermined timing (at a predetermined date/time or at intervals of a predetermined period), the CO2 integrated amount managing part 126 of the client computer 12 transmits the CO2 information to the customer data managing device 31 of the manufacturer system 3 as the effective value of carbon offset as specified by the governmental organization (step S301).

The customer-basis credit/point managing part 311 of the customer data managing device 31 computes a carbon offset credit or point in accordance with the received effective value of carbon offset (step S302).

The customer-basis credit/point managing part 311 records the computed carbon offset credit or point and the received effective value of carbon offset (step S303), and transmits the computed carbon offset credit or point to the client computer 12 (step S304). Separately from the step S304, the manufacturer is enabled to receive the formal effective value of carbon offset by notifying the amount to the carbon offset provider 4.

When the carbon offset credit or point is received, the client computer 12 causes the credit/point managing part 127 to record the carbon offset credit or point internally for the management of the carbon offset credit or point (step S305). The credit/point managing part 127 displays the carbon offset credit or point automatically or in response to a displaying request input from the user.

On the other hand, as shown in FIG. 11, at a predetermined timing (at a predetermined date/time or at intervals of a predetermined period), the CO2 integrated amount managing part 1308 of the image forming device 13 transmits the CO2 information to the customer data managing device 31 of the manufacturer system 3 as the effective value of carbon offset as specified by the governmental organization (step S311).

The customer-basis credit/point managing part 311 of the customer data-managing device 31 computes a carbon offset credit or point in accordance with the received effective value of carbon offset (step S312). The customer-basis credit/point managing part 311 records the computed carbon offset credit or point and the received effective value of carbon offset (step S313), and transmits the computed carbon offset credit or point to the image forming device 13 (step S314). Separately from the step S314, the manufacturer is enabled to receive the formal effective value of carbon offset by notifying the amount to the carbon offset provider 4. A carbon offset credit or point corresponding to the cost of carbon offset assigned to the products purchased by the customer can be included in the carbon offset credit or point notified.

When the carbon offset credit or point is received, the image forming device 13 causes the credit/point managing part 1309 to record the carbon offset credit or point internally for the management of the carbon offset credit or point (step S315). The credit/point managing part 1309 displays the carbon offset credit or point automatically or in response to a displaying request input from the user.

As described above, the print/copy control system of the present embodiment provides the following advantages.

(1) Because the listing of each of the non-standard sets of print/copy conditions, the standard set of print/copy conditions of the image forming device and the set of print/copy conditions currently selected by the user for comparison is presented to the user at a time of print/copy setting, the user can recognize that there are various patterns of a printing/copying process, and it is possible to promote use of the printing/copying process by the non-standard sets of print/copy conditions.

(2) Because the listing of other selectable sets of print conditions of image forming devices other than the default printer is presented to the user at a time of print setting on the client computer, the range of selection of print conditions can be expanded.

(3) Because the result information of a result of a printing/copying process for comparison is presented to the user at a time of selecting the print/copy conditions, the user can easily recognize how much saving of the consumables or electric power relative to the case of the standard set of print/copy conditions is attained.

(4) Because the advice information of a printing/copying process is presented to the user at a time of print/copy setting, it is possible to reduce the waste of resources or the futility by re-printing, re-copying, etc.

(5) Because the listing of the integrated value of CO2 emissions and the amount of CO2 reduction for comparison is presented to the user at a time of selecting the print/copy conditions, an opportunity to choose the non-standard set of print/copy conditions with few CO2 emissions can be increased and CO2 reduction activities can be promoted.

(6) Because the integrated value of CO2 emissions or the amount of CO2 reduction is notified to an external device, such as a manufacturer, via a network as an effective value of carbon offset, it is possible to promote CO2 reduction activities. The integrated amount of CO2 emissions and the amount of CO2 reduction can be treated as a formal effective value of carbon offset, which facilitates the computation of the formal effective value of carbon offset.

(7) Because the carbon offset credit or point according to the effective value of carbon offset is given from the manufacturer to the customer, the incentive to CO2 reduction activities can be given to the customer.

(8) Because the carbon offset credit or point corresponding to the cost of carbon offset assigned to the purchased products is given to the customer, the formal record of the carbon offset credit can be given to the customer and the consciousness of participation in CO2 reduction activities can be evoked.

According to the print/copy control system of the present disclosure, it is possible to take appropriate measures for performing a printing/copying process and increase an opportunity to select the non-standard sets of print/copy conditions of an image forming device.

The present disclosure is not limited to the specifically disclosed embodiments, and variations and modifications may be made without departing from the scope of the present disclosure.

The present application is based upon and claims the benefit of priority of the prior Japanese patent application No. 2010-148130, filed on Jun. 29, 2010, the contents of which are incorporated herein by reference in their entirety.

What is claimed is:

1. A print/copy control system including a processing unit and a printing unit, the processing unit comprising:
    a first unit to receive a set of print/copy conditions selected by a user;
    a second unit to receive a standard set of print/copy conditions of an image forming device designated by a user's selection;
    a third unit to receive other selectable sets of print/copy conditions of the image forming device;

a display unit to display a listing of each of the standard set of print/copy conditions of the image forming device, the set of print/copy conditions selected by the user, and the other selectable sets of print/copy conditions of the image forming device for comparison, a print processing unit to receive one of the sets of the print/copy conditions which has been selected among the listing displayed in the display unit, and a unit to generate advice information of a printing/copying process with respect to each of the respective sets of print/copy conditions displayed by the display unit, wherein the display unit displays the listing which further includes a listing of the advice information for comparison, wherein the printing unit performs the printing based on a selected one of the sets of the print/copy conditions, and wherein the listing of the each of the standard set of print/copy conditions, the set of print/copy conditions selected by the user, and the other selectable sets of print/copy conditions displayed in the display unit includes conditions of full color, duplex and collective modes.

2. The print/copy control system according to claim 1, wherein the processing unit further comprises a unit to receive, after a printing dialog is displayed by the display unit, other selectable sets of print conditions of other image forming devices available in a network, and wherein the display unit displays the listing which further includes a listing of the other selectable sets of print conditions of the other image forming devices for comparison.

3. The print/copy control system according to claim 1, wherein the processing unit further comprises a unit to generate result information that indicates a result of a printing/copying process, with respect to each of the respective sets of print/copy conditions displayed by the display unit, and wherein the display unit displays the listing which further includes a listing of the result information for comparison.

4. The print/copy control system according to claim 1, wherein the processing unit further comprises a unit to compute an amount of carbon-dioxide emissions with respect to each of the respective sets of print/copy conditions displayed by the display unit, and wherein the display unit displays the listing which further includes a listing of the amount of carbon-dioxide emissions for comparison.

5. The print/copy control system according to claim 4, wherein the processing unit further comprises:

a unit to compute an integrated amount of the amounts of carbon-dioxide emissions with respect to the sets of print/copy conditions having been used to perform a printing/copying process; and a unit to display the integrated amount of carbon-dioxide emissions.

6. The print/copy control system according to claim 5, wherein the processing unit further comprises a unit to transmit the integrated amount of carbon-dioxide emissions to an external device via a network as an effective value of carbon offset.

7. The print/copy control system according to claim 6, wherein the processing unit further comprises:

a unit to receive a notice of a carbon offset credit or point according to the transmitted effective value of carbon offset, from the external device via the network; and a unit to display the received carbon offset credit or point.

8. The print/copy control system according to claim 1, wherein the processing unit further comprises a unit to compute an amount of carbon-dioxide reduction of each of the set of print/copy conditions selected by the user and the other selectable sets of print/copy conditions, relative to an amount of carbon-dioxide emissions of the standard set of print/copy conditions, and wherein the display unit displays the listing which further includes a listing of the amount of carbon-dioxide reduction for comparison.

9. The print/copy control system according to claim 1, wherein the processing unit further comprises:

a unit to receive a notice of a carbon offset credit or point corresponding to a cost of carbon offset assigned to purchased products from an external device via a network; and a unit to display the received carbon offset credit or point.

10. The print/copy control system according to claim 1, wherein the standard set of the print/copy conditions are conditions that have been set as the standard set by the user, and the other selectable sets of the print/copy conditions are selectable conditions that have not been set as the standard set by the user.

11. The print/copy control system according to claim 1, wherein the print processing unit is configured to modify the set of print/copy conditions that is received by the first unit based on the selected one of the sets of the print/copy conditions.

12. An image forming device including a processing unit and a printing unit, the processing unit comprising:

a response unit to transmit a standard set of copy conditions and other selectable sets of copy conditions in response to a request received from an external device;

a first unit to receive a set of copy conditions selected by a user at a time of a document copying setting;

a second unit to receive a standard set of copy conditions;

a third unit to receive other selectable sets of copy conditions;

a display unit to display a listing of each of the standard set of copy conditions, the set of copy conditions selected by the user and the other selectable sets of copy conditions for comparison, a print processing unit to receive one of the sets of the copy conditions which has been selected among the listing displayed in the display unit, and a unit to generate advice information of a printing process with respect to each of the respective sets of copy conditions displayed by the display unit, wherein the display unit displays the listing which further includes a listing of the advice information for comparison, wherein the printing unit performs the printing based on a selected one of the sets of copy conditions, and wherein the listing of the each of the standard set of copy conditions, the set of copy conditions selected by the user and the other selectable sets of copy conditions displayed in the display unit include conditions of full color, duplex and collective modes.

13. The image forming device according to claim 12, wherein the processing unit further comprises a unit to receive, after a printing dialog is displayed by the display unit, other selectable sets of print conditions of other image forming devices available in a network, and wherein the display unit displays the listing which further includes a listing of the other selectable sets of print conditions of the other image forming devices for comparison.

14. The image forming device according to claim 12, wherein the processing unit further comprises a unit to generate result information that indicates a result of a printing/copying process, with respect to each of the respective sets of print/copy conditions displayed by the display unit, and
wherein the display unit displays the listing which further includes a listing of the result information for comparison.

15. A print/copy control method for use in a print/copy control system including a processing unit and a printing unit, the method comprising:
receiving, by a first unit of the processing unit, a set of print/copy conditions selected by a user;
receiving, by a second unit of the processing unit, a standard set of print/copy conditions of an image forming device designated by a user's selection;
receiving, by a third unit of the processing unit, other selectable sets of print/copy conditions of the image forming device;
displaying, by a display unit of the processing unit, a listing of each of the standard set of print/copy conditions of the image forming device, the set of print/copy conditions selected by the user, and the other selectable sets of print/copy conditions of the image forming device for comparison,
receiving one of the sets of the print/copy conditions which has been selected among the listing displayed in the display unit,
performing, by the printing unit, the printing based on a selected one of the sets of the print/copy conditions,
generating, by the processing unit, advice information of a printing/copying process with respect to each of the respective sets of print/copy conditions displayed by the display unit, and
displaying, by the display unit of the processing unit, the listing which further includes a listing of the advice information for comparison,
wherein the listing of the each of the standard set of print/copy conditions, the set of print/copy conditions selected by the user, and the other selectable sets of print/copy conditions displayed in the display unit includes conditions of full color, duplex and collective modes.

* * * * *